US010123031B2

(12) United States Patent
Cain et al.

(10) Patent No.: US 10,123,031 B2
(45) Date of Patent: Nov. 6, 2018

(54) MPEG-2 VIDEO WATERMARKING TECHNIQUE

(71) Applicant: Cisco Technology, Inc., San Jose, CA (US)

(72) Inventors: Harel Cain, Jerusalem (IL); Yaron Sella, Beit Nekofa (IL); Michal Devir, Haifa (IL)

(73) Assignee: Cisco Technology, Inc., San Jose, CA (US)

( * ) Notice: Subject to any disclaimer, the term of this patent is extended or adjusted under 35 U.S.C. 154(b) by 311 days.

(21) Appl. No.: 14/790,028

(22) Filed: Jul. 2, 2015

(65) Prior Publication Data

US 2017/0006301 A1    Jan. 5, 2017

(51) Int. Cl.
| | |
|---|---|
| *H04N 19/467* | (2014.01) |
| *H04N 19/593* | (2014.01) |
| *H04N 19/177* | (2014.01) |
| *H04N 19/184* | (2014.01) |
| *H04N 19/61* | (2014.01) |

(Continued)

(52) U.S. Cl.
CPC ......... *H04N 19/467* (2014.11); *H04N 19/174* (2014.11); *H04N 19/176* (2014.11); *H04N 19/177* (2014.11); *H04N 19/18* (2014.11); *H04N 19/184* (2014.11); *H04N 19/186* (2014.11); *H04N 19/59* (2014.11); *H04N 19/593* (2014.11); *H04N 19/61* (2014.11); *H04N 19/625* (2014.11); *H04N 21/8358* (2013.01)

(58) Field of Classification Search
CPC .. H04N 19/467; H04N 19/184; H04N 19/177; H04N 21/8358; H04N 19/625

USPC ..................................................... 375/240.12
See application file for complete search history.

(56) References Cited

U.S. PATENT DOCUMENTS 6,037,984 A    3/2000  Isnardi et al.
6,195,394 B1 *  2/2001  Arbeiter ............. H04N 21/6377
                                       375/240.21

(Continued)

FOREIGN PATENT DOCUMENTS

WO    WO2007085632    8/2007

OTHER PUBLICATIONS

International Search Report and Written Opinion, dated Jul. 12, 2016, issued in a corresponding application (PCT/IB2016/052618).

(Continued)

*Primary Examiner* — Jeremiah C Hallenbeck-Huber
*Assistant Examiner* — Stefan Gadomski
(74) *Attorney, Agent, or Firm* — Merchant & Gould P.C.

(57) ABSTRACT

In one embodiment, a method, system and apparatus for watermarking MPEG-2 compressed video is described, the method, system and apparatus including detecting a pair of neighboring blocks in a MPEG-2 encoded I-frame, determining if the pair of neighboring blocks have dct_dc_differential fields with different values that are within a given threshold value of each other, and embedding a watermark payload bit in the neighboring blocks as a positive result of the determining, the embedding including ordering dct_dc_differential fields of the neighboring blocks such that ordering the dct_dc_differential fields in a first manner encodes a one bit and ordering the dct_dc_differential fields in a second manner encodes a zero bit. Related embodiments of methods, systems, and apparatuses are also described.

17 Claims, 7 Drawing Sheets

(51) Int. Cl.
*H04N 19/59* (2014.01)
*H04N 19/186* (2014.01)
*H04N 19/174* (2014.01)
*H04N 19/18* (2014.01)
*H04N 19/625* (2014.01)
*H04N 19/176* (2014.01)
*H04N 21/8358* (2011.01)

(56) References Cited

U.S. PATENT DOCUMENTS

| | | | |
|---|---|---|---|
| 6,373,960 | B1 | 4/2002 | Conover et al. |
| 6,621,867 | B1* | 9/2003 | Sazzad ............... G06T 7/12 348/E5.064 |
| 7,295,615 | B1* | 11/2007 | Kamijo ............... G06T 1/0035 375/240.26 |
| 8,064,635 | B2 | 11/2011 | Baudry et al. |
| 8,270,485 | B2 | 9/2012 | Baudry et al. |
| 2001/0005397 | A1* | 6/2001 | Watanabe ........... H04N 19/467 375/240.2 |
| 2003/0033529 | A1* | 2/2003 | Ratnakar ............. G06T 1/0028 713/176 |
| 2003/0142750 | A1* | 7/2003 | Oguz .................. H04N 5/142 375/240.18 |
| 2004/0088302 | A1* | 5/2004 | Gormish ............. H04N 19/895 |
| 2004/0093498 | A1* | 5/2004 | Noridomi ............ G06T 1/0028 713/176 |
| 2006/0002552 | A1* | 1/2006 | LeComte ............. H04N 5/913 380/217 |
| 2008/0101720 | A1* | 5/2008 | Wang .................. H04N 19/176 382/275 |
| 2009/0175335 | A1* | 7/2009 | Baudry ............... G06T 1/0035 375/240.12 |
| 2010/0254617 | A1* | 10/2010 | Hwang ............... G06T 3/602 382/232 |
| 2011/0222687 | A1* | 9/2011 | Mori ................... H04N 7/1675 380/200 |
| 2011/0280434 | A1* | 11/2011 | Mamidwar .......... H04N 21/235 382/100 |

OTHER PUBLICATIONS

Nasir, Ibrahim; Adaptive Watermarking of Color Images in the DCT Domain, Proceedings of the 2010 International Conference on Signal Processing and Multimedia Applications, IEEE, Jul. 26, 2010.

Biswas, Satyen; An Adaptive Compressed MPEG-2 Video Watermarking Scheme, IEEE Transactions on Instrumentation and Measurement; vol. 54, No. 5; Oct. 2005.

Hartung, Frank; Digital Watermarking of MPEG-2 Coded Video in the Bitstream Domain, Acoustics, Speech, and Signal Processing 1997. 1997 IEEE Int'l Conf. on Munich, Germany, Apr. 21-24, 1997, IEEE, vol. 4, Apr. 21, 1997, pp. 2621-2624, XP010225693.

ISO/IEC 13818-2 (Dec. 15, 2000); Information Technology—Generic Coding of Moving Pictures and Associated Audio Information: Video, p. 5.

Langelaar, Gerrit C.; Optimal Differential Energy Watermarking of DCT Encoded Images and Video, IEEE Transactions on Image Processing; vol. 10, No. 1; Jan. 2001.

Liu, Hongmei; A MPEG-2 Video Watermarking Algorithm With Compensation in Bit Stream, Digital Rights Management. Technologies, Issues Challenges and Systems. First Int'l Conf. Oct. 31, 2005, pp. 123-134, XP002445774.

Wolfgang, Raymond B.; Perceptual Watermarks for Digital Images and Video, Proceedings of the IEEE, IEEE, NY, US, vol. 87, No. 7, Jul. 1999, XP011044240.

Wong, Peter H. W.; Data Hiding and Watermarking in JPEG Compressed Domain by DC Coefficient Modification, Security and Watermarking of Multimedia Contents II, Proceedings of SPIE vol. 3971, p. 237-244; Jan. 2000.

Zhang, Jun; Embedding Watermark in MPEG Video Sequence, Multimedia Signal Processing, 2001 IEEE Fourth Workshop on Oct. 3-5, 2001, Oct. 3, 2001, pp. 535-540, XP010565828.

\* cited by examiner

PERFORM THE METHOD OF FIG. 6

COUNT THE NUMBER OF BITS DETERMINED AS BEING THE FIRST OF THE TWO POSSIBLE BITS AND THE NUMBER OF BITS DETERMINED AS BEING THE SECOND OF THE TWO POSSIBLE BITS FOR ALL IDENTIFIED NEIGHBORING BLOCKS IN A CANDIDATE FRAME

TAKE A MAJORITY BETWEEN THE RESULTING COUNTS OF THE FIRST OF THE TWO POSSIBLE BITS AND SECOND OF THE TWO POSSIBLE BITS AND RECOVERING THE MAJORITY COUNT AS SIGNIFYING AN EMBEDDED WATERMARK BIT

FIG. 7B

MPEG-2 VIDEO WATERMARKING TECHNIQUE

TECHNICAL FIELD

The present invention generally relates to systems and methods for embedding video watermarks.

BACKGROUND OF THE INVENTION

With the recent advances in Internet content distribution, including peer-to-peer networks and real-time video streaming systems, in order to deter unauthorized distribution of content, it data can be embedded in video to trace intercepted potentially illegally distributed video back to a point of distribution. The point of distribution is often an authorized viewer, such as a cinema where pirated copies are made with camcorders, or a television integrated receiver decoder (IRD) whose output is captured and re-encoded into a video file. After tracing the source, measures can be taken to prevent further unauthorized distribution.

Embedding signals in video is a field rich in both academic research and commercial inventions. Covert watermarking, i.e. embedding an imperceptible yet visible watermark in the video, is well known in the art, as are overt watermarks that are clearly visible and overlaid/displayed on top of the video. Steganographic watermarks are also well known in the art.

BRIEF DESCRIPTION OF THE DRAWINGS

The present invention will be understood and appreciated more fully from the following detailed description, taken in conjunction with the drawings in which:

FIGS. 7A-7B is a simplified flow chart of a second method of detecting the watermark of FIG. 1.

DESCRIPTION OF EXAMPLE EMBODIMENTS

Overview

A method, system and apparatus are described, the method, system and apparatus including detecting a pair of neighboring blocks in a MPEG-2 encoded I-frame, determining if the pair of neighboring blocks have dct_dc_differential fields with different values that are within a given threshold value of each other, and embedding a watermark payload bit in the neighboring blocks as a positive result of the determining, the embedding including ordering dct_dc_differential fields of the neighboring blocks such that ordering the dct_dc_differential fields in a first manner encodes a one bit and ordering the dct_dc_differential fields in a second manner encodes a zero bit. Related methods, systems, and apparatuses are also described.

Exemplary Embodiment

Figure 1:
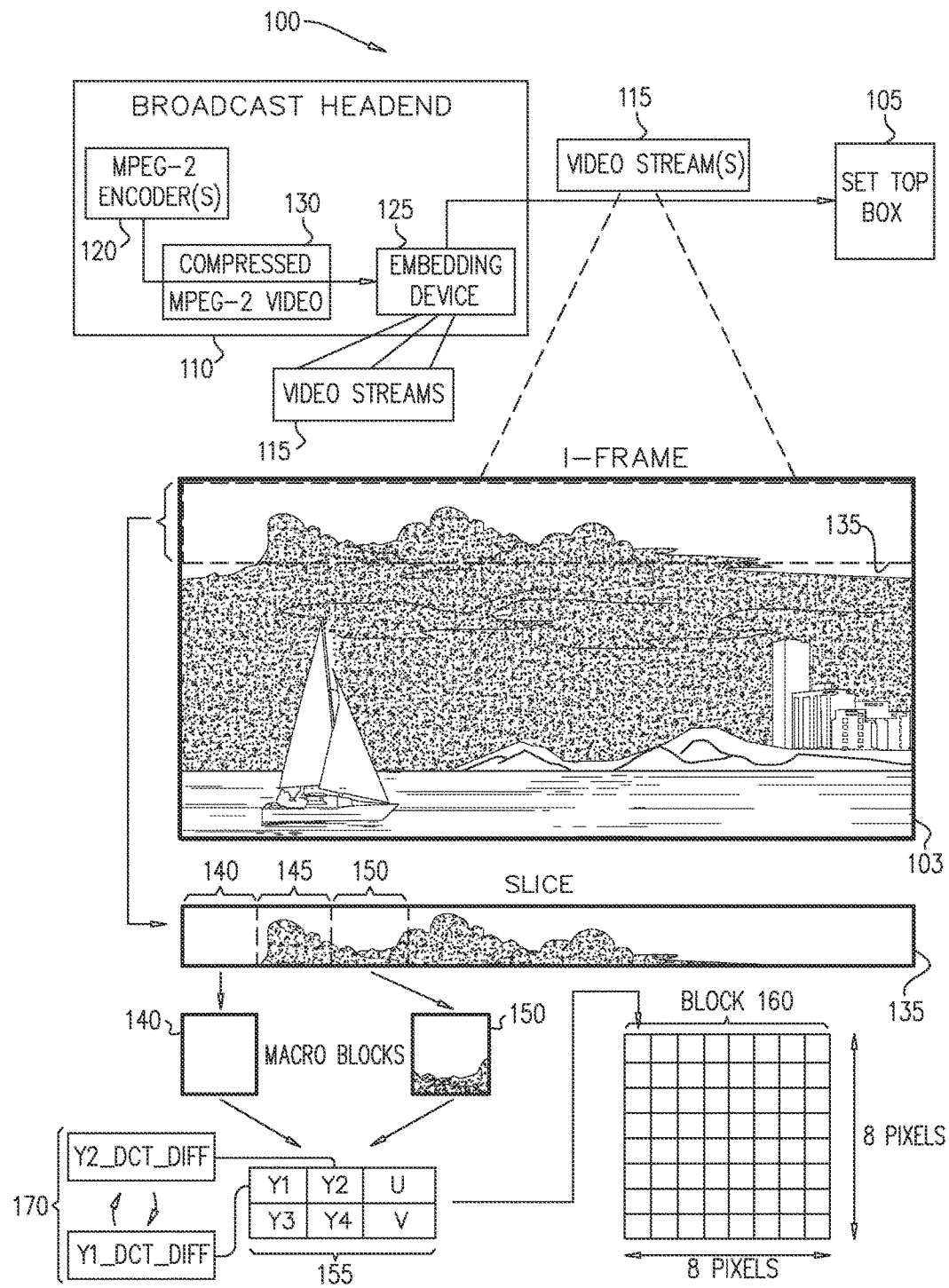
FIG. 1 is a simplified pictorial illustration of a system for embedding watermarks in MPEG-2 video, in accordance with an embodiment of the present invention.

Reference is now made to FIG. 1, which is a simplified pictorial illustration of a system 100 for embedding watermarks in MPEG-2 video, in accordance with an embodiment of the present invention. FIG. 1 depicts an intra-coded video frame (I-frame) 103, and shows a data hierarchy from a high level of encoding (the video frame) 103 to a low level of encoding (blocks 160). As will be explained below, a single watermark payload bit is embedded in the I-frame 103. Video watermarks are useful for a variety of purposes in the domain of pay television, such as allowing a detector to identify the creator of the video, the operator broadcasting it, or even the identity of the subscriber receiving it. The latter is known as forensic watermarking and can serve to identify a legitimate subscriber of the pay TV service who is leaking the stolen video content and for example streaming it online. A method of embedding user identifying data is discussed below, with reference to FIG. 4.

Those skilled in the art will appreciate that a digital video frame, such as I-frame 103, is presented to a viewer as an ordered arrangement of pixels on a viewing monitor or screen. Certain changes may be made to one or more of the pixels which will, typically, not be perceptible to the viewer.

Traditionally in pay TV, if the watermark is meant to be a forensic watermark encoding the identity of the end user, it would be natural for the embedding of user identifying data to occur in the user's client device (such as a set top box (STB) 105). However, the STB 105 typically has limited computational power and other restrictions that prevent it from embedding certain kinds of strong watermarks (imperceptible, resilient, high-capacity etc.) into videos it displays. It is appreciated that high end STBs 105 or other client devices might comprise sufficient computing power and may in fact embed the watermark using the method and system described herein. Nevertheless, the following description will focus on embedding the watermark at a headend, without intending any loss of generality. Furthermore, in some client devices, such as client devices which operate with a so called "common interface" (CI) for security elements, such as smart cards, the client device does not have easy access to uncompressed video. Such a device would also benefit from the method described herein for embedding the watermark in MPEG-2 compressed video.

Therefore there is a need to embed forensic watermarks already at a broadcast headend 110. To do this, the headend 110 broadcasts multiple versions of sections of video streams 115, the multiple versions of sections of video streams 115 being visually slightly different from each other. For each such section the STB 105 is operative to select which of the versions should be decrypted, decoded and displayed. The headend 110, however, has also some limitations such as using hardware based legacy video encoders 120 which are not easily modifiable.

Accordingly, the watermark is embedded by an embedding device 125 (described below, with reference to FIG. 3), after the video has been prepared as a compressed MPEG-2 video stream 130, which is encoded by the video encoders 120. The ability to embed watermarks on encoded (i.e., compressed) MPEG-2 video streams 130 (i.e., in the compressed domain) without having to fully decode the MPEG-2 video streams 130, is known in the art to be a computationally intensive process. In other words, an embedding device 125 of the watermarking system 100 receives compressed MPEG-2 videos as input and manipulates the compressed videos directly in order to embed the watermark. It is appreciated that although the embedding device 125 is depicted separately from the video encoders 120, the embedding device 125 may be comprised in the video encoders 120.

As an extra requirement, having to do with the structure of MPEG-2 Transport Streams, the embedding device 125 does not change the length, in bits, of any video element above macroblock level (such as an encoded frame 103 or slice 135). In other words the embedding device 125 may flip bits but cannot insert or remove bits from the compressed MPEG-2 video stream 130. If this requirement were not met, it would mean that the transport stream layer will need to be reconstructed at the headend, which is again computationally expensive and should be avoided when possible.

Figure 2:
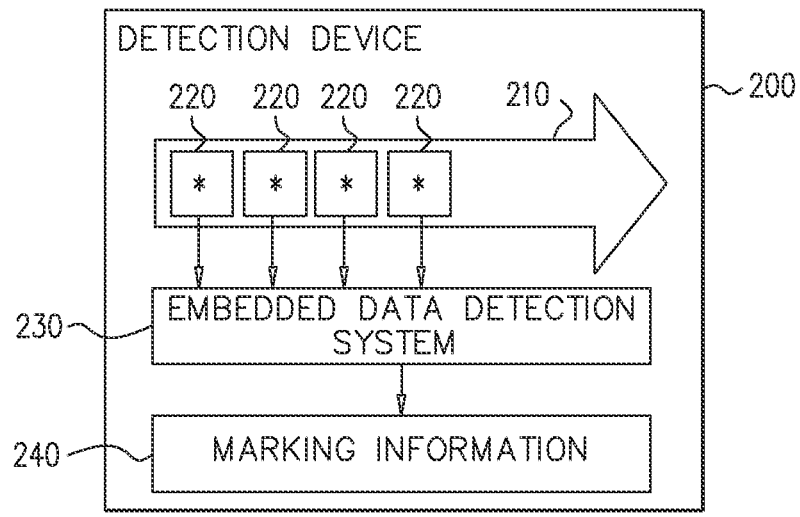
FIG. 2 is a simplified block drawing of a detection device for detecting the watermark embedded using the system of FIG. 1.

Reference is now additionally made to FIG. 2, which is a simplified block drawing of a detection device 200 for detecting the watermark embedded using the system 100 of FIG. 1. As is true in any watermarking system, the watermark detection device 200 needs to be capable of recovering the embedded watermark payload from the watermarked video with high fidelity. A broadcaster, a content owner, or other appropriately authorized agent may also acquire the video stream, such as video stream 210, from a content sharing network. It is appreciated that the acquired video stream 210 is not necessarily the same as a video stream 115 which is originally broadcast from the broadcast headend 100. By way of example, the video stream 115 which is originally broadcast from the broadcast headend 100 may have been re-encoded, transcoded, cropped, downgraded, etc. prior to being uploaded to the content sharing network. The watermark is designed to be resilient and still be detectable regardless of the re-encoding, transcoding, cropping, downgrading of video quality, etc. in the version which was uploaded to the content sharing network.

The detection device 200 detects and extracts the embedded data, depicted as an asterisk, *, from each of the frames 220 comprising embedded watermark data comprised in the acquired video stream 210. The extracted embedded data is then input into an embedded data detection system 230, which is able to determine marking information 240 (i.e. the watermark).

Returning now to the discussion of FIG. 1, as is the case with many watermarking systems, the watermark system 100 is designed to have a subtle effect on the video—i.e. the effect is typically unnoticeable to the viewers. Furthermore, viewers typically cannot tell whether the video they are watching comprises a watermark or not.

Furthermore, the watermark embedded by the watermark system 100 is typically designed to be resilient to the video being: re-encoded to MPEG-2 video; transcoded to non-MPEG-2 video; cropped; resized; degraded; and so forth. As a consequence, the watermark detector 200 is not assumed to receive MPEG-2 video as input 210, and in fact detects the embedded watermark payload 240 in the uncompressed domain (i.e., after the video has been decoded) on a series of images.

The following describes how an I-frame is encoded with the embedded watermark. Other types of frames are out of the scope of the following discussion.

In an MPEG-2 (H.262) I-frame (typically having a 4:2:0 subsampling profile—i.e. four luminance blocks and two chrominance blocks), every macroblock 140, 145, 150 consists of six blocks 155—four blocks for the luminance component Y (Y1-Y4), and two for the chrominance components U and V (U and V, or their equivalents are sometimes referred to as Cb and Cr, as well as by other referents, as are known in the art). Each of these six blocks 155 are 8×8 pixels 160 in size.

As described in the following paragraphs, the watermarking system 100 embeds the watermark payload 240 by swapping DC coefficients (a first coefficient) of coefficients arrays of DCTs (discrete cosine transformation) of the blocks. The details of which DC coefficients are selected for swapping, and how the swapping is performed is described in greater detail below.

Three predictors, one for each component Y, U and V, act as a kind of cumulative sum, as is explained below. The three predictors are reset at the beginning of every slice (an array of macroblocks, normally forming one horizontal row of macroblocks), such as slice 135 to a default value (typically 128).

In the video stream, each block (i.e. Y1-Y4, U and V) is encoded as a series of 64 DCT (discrete cosine transformation) coefficients which are the result of performing a DCT transform on actual pixel values in the block. The first DCT coefficient of each block 155, which is known in the art as the DC coefficient, is encoded as a delta value that is added or subtracted from the current predictor value for the corresponding luminance and chrominance components. Because the DC coefficient is encoded differently from subsequent DCT coefficients, those other DCT coefficients are sometimes referred to as "AC coefficients" ("AC" as opposed to "DC"). In summary, for each macroblock, there are three predictors: one for the four Y blocks, one for the U block, and one for the V block.

The following table is taken from part 2 of the MPEG-2 standard, ISO IEC 13818.2 (sometimes referred to as H.262), and defines the coding of each of the blocks 155:

|  | No. of bits | Mnemonic |
|---|---|---|
| Block(i) { | | |
|   if (pattern_code[i]) { | | |
|     if (macroblock_intra) { | | |
|       if (i < 4 ) { | | |
|         dct_dc_size_luminance | 2-9 | vlclbf |
|         if (dct_dc_size_luminance != 0) | | |
|           dct_dc_differential | 1-11 | uimsbf |
|       } else { | | |
|         dct_dc_size_chrominance | 2-10 | vlclbf |
|         if (dct_dc_size_chrominance != 0) | | |
|           dct_dc_differential | 1-11 | uimsbf |
|       } | | |
|     } else { | | |
|       First DCT coefficient | 2-24 | vlclbf |
|     } | | |
|     while ( nextbits( ) != End of block ) | | |
|       Subsequent DCT coefficients | 3-24 | vlclbf |
|     End of block | 2-4 | vlclbf |
|   } | | |
| } | | |

Where:

vlclbf stands for variable length code, left bit first, where left refers to the order in which the variable length codes are written.

uimsbf stands for unsigned integer, most significant bit first.

pattern_code indicates whether or not blocks in a macro block are present in a bitstream, where if the relevant bit of the pattern code is set to one, then the corresponding block is present in the bitstream, otherwise nothing is present.

dct_dc_size fields indicate a length of the luminance or chrominance field, as appropriate.

dct_dc_differential is a field dct_dc_size bits in length. A differential value is recovered from encoded data which is added to a current predictor value in the current chrominance or luminance component in order to decode the first DCT coefficient. The initial value of the predictor depends on the value of intra_dc_precision used.

As was noted above, the DC coefficient is encoded as a delta value. These delta values, referred to in the MPEG-2 specification as dct_dc_differential_l (for luminance) or dct_dc_differential_c (for chrominance), will, for convenience sake, together with the dct_dc_size field, be called dct_diff in the present specification and claims. dct_diff is encoded in a variable length field, separate from the run-length based encoding of the other DCT coefficients. References to the value of the dct_diff is understood to be referring to the value of the dct_dc_differential field, whether for chrominance or for luminance. The length of this variable length field, which can range from 0 to 11, is itself encoded in another variable length field (dct_dc_size), where the different lengths are encoded according to a prefix-free table of values defined in the standard, such that more frequent values have shorter codewords. These two related variable length fields strongly limit how an embedder can change the delta values, for example if the delta is zero, its length is normally also zero, so changing a zero delta will mean increasing the length of the delta field, and inserting new bits into the encoded video, which would require removing bits from another block and this becomes a difficult set of constraints to solve, while maintaining the correct syntax of MPEG-2 encoded video and the imperceptibility of the watermark. Further, because of the cumulative nature of the DC coefficients, which are encoded by the MPEG-2 encoders 120 only using the deltas, any change to any of the deltas will carry on to the rest of the slice 135, unless another change reverses the first change.

Payload zeros (0s) and ones (1s) can be embedded using selected ones of the blocks based on criteria which are now explained.

In order to encode a bit in the MPEG-2 bit stream without changing the length of the macroblocks 140, 145, 150 and slices 135, and therefore, to cause a small, visually imperceptible change in one block 155 only, the following method is implemented:

1. Inside I-frames 103 only, detect a pair of two neighboring blocks. Neighboring blocks are typically two consecutive blocks, which may either be two consecutive luminance blocks in the same macroblock, such as Y2 and Y3, or two consecutive chrominance blocks in two consecutive macroblocks. That is to say, by way of example, the U block of macroblock 140 and the U block of macroblock 145. However, this could be extended to cover pairs of blocks which are not immediately consecutive, but close to each other in the visual layout of the frame. When choosing two consecutive blocks, the watermark will affect only pixels in a single macroblock. The more relaxed the definition of neighboring blocks, the larger the area of the frame impacted by the watermark.

2. Check if the absolute value of the difference between the two dct_diff values of the neighboring blocks is greater than 0 and smaller than some threshold. Typically, and without the loss of generality, threshold values are either 2 or 3.

3. The payload bit of the watermark to be embedded determines whether the first or second dct_diff should be greater than or less than the dct_diff value of the neighboring block. For example, if embedding a 0, then the embedding scheme may require that the first of the pair of dct_diffs be the smaller of the two, and the second be the greater of the two. Similarly, if embedding a 1, then the embedding scheme may require that the second of the pair of dct_diffs be the smaller of the two, and the first be the greater of the two. It is appreciated that the order (i.e. smaller/greater) is arbitrary.

Therefore, if the first dct_diff is greater than the second one but should in fact be smaller in order to embed the payload bit, the two dct_diff values are swapped 170 between the two neighboring blocks. The swapping 170 is performed by swapping 170 the dct_size and dct_dc_differential_l or dct_dc_differential_c fields between the two blocks. Note that the dct_coeffs field, if present, which contains the encoded AC coefficients for the block, are not swapped among the two blocks. This swap 170 preserves the total length in bits of the encoded macroblock (or, if done between two neighboring macroblocks, the total length of the encoded slice).

The following table presents six exemplary cases, for two neighboring blocks, A and B:

| Case | To Embed | A_dct_diff | B_dct_diff | A_dct_diff − B_dct_diff | Used for WM (Y/N) | SWAP (Y/N) |
| --- | --- | --- | --- | --- | --- | --- |
| #1 | 0 | 135 | 133 | 2 | Y | Y |
| #2 | 0 | 133 | 135 | −2 | Y | N |
| #3 | 1 | 135 | 133 | 2 | Y | N |
| #4 | 1 | 133 | 135 | −2 | Y | Y |
| #5 |   | 133 | 142 | −9 | N | N/A |
| #6 |   | 133 | 133 | 0 | N | N/A |

In case #1, since A_dct_diff>B_dct_diff, in order to embed the bit 0, A_dct_diff and B_dct_diff would be swapped 170. In case #2, A_dct_diff<B_dct_diff, so in order to embed the bit 0, A_dct_diff and B_dct_diff will not be swapped. In case #3, since A_dct_diff>B_dct_diff, in order to embed the bit 1, A_dct_diff and B_dct_diff will not be swapped. In case #4, A_dct_diff<B_dct_diff, so in order to embed the bit 1, A_dct_diff and B_dct_diff would be swapped 170. For completeness sake, in case #5, A_dct_diff−B_dct_diff is greater than 3, and so this pair of blocks is not used for embedding the watermark, and is later ignored by the detector.

Case #5 is mentioned, by way of example, where the field A_dct_diff may not be swapped with the dct_diff field of subsequent block B.

Finally, in case #6, A_dct_diff=B_dct_diff. In this case, the two fields are not used for watermarking (i.e. the two fields are not swapped).

This process of embedding a payload bit is typically repeated, for every pair of neighboring blocks that satisfy the condition that the difference between the absolute values of their two dct_diff values is greater than 0 and smaller than the threshold. If a second block in a pair of neighboring blocks is not used with the first block in the pair of neighboring blocks to embed a payload bit, (i.e. the pair of blocks was found to be unsuitable for embedding) then that block may be used as a first block with its subsequent neighboring block. This allows for maximal redundancy in embedding bits of information into the frame. However, the more blocks that are swapped, the greater the potential that noticeable changes are introduced into the video frame. Accordingly, in some embodiments watermarking may be implemented such that a payload bit is embedded in only some of the neighboring block pairs that satisfy the condition stated above (i.e. the difference between the block values is greater than zero and within a given threshold). For example, it may be that just the first such pair of blocks in every slice is used for watermarking.

Figure 3:
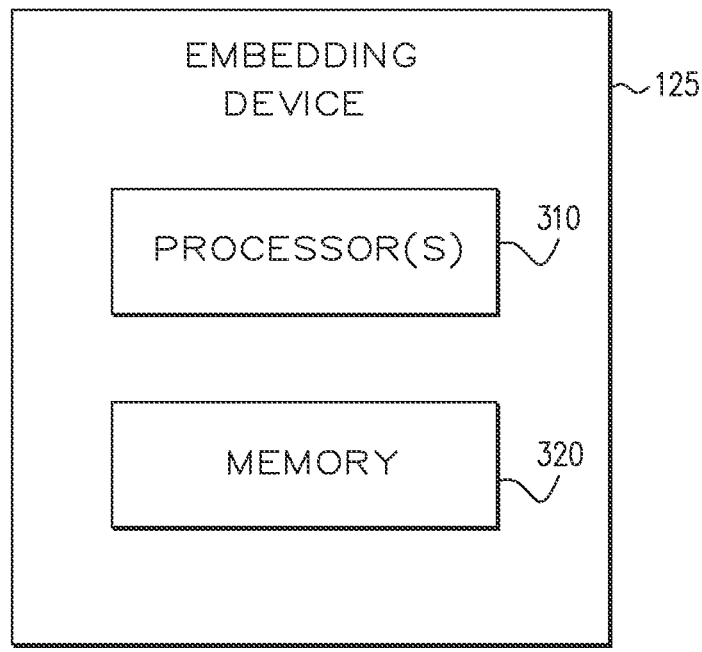
FIG. 3 is a block diagram drawing of an embedding device for use in the system of FIG. 1.

Reference is now additionally made to FIG. 3, which is a block diagram drawing of the embedding device 125 for use in the system of FIG. 1. The embedding device 125 comprises hardware and software components, as is well known in the art.

The embedding device 125 comprises at least one processor 310, and may comprise more than one processor 310. One of the processors 310 may be a special purpose processor operative to perform the watermark embedding, according to the method described herein. In addition, the embedding device 125 comprises non-transitory computer-readable storage media (i.e. memory) 320. The memory 320 may store instructions, which at least one of the processors 310 may execute, in order to perform the method of watermark embedding described herein. The embedding device 125 also comprises typical and standard hardware and software components as are known in the art.

It is appreciated that the detection device 200 of FIG. 2 may also be designed with the same or similar components as were described in the preceding paragraph for the embedding device 125.

Figure 4:
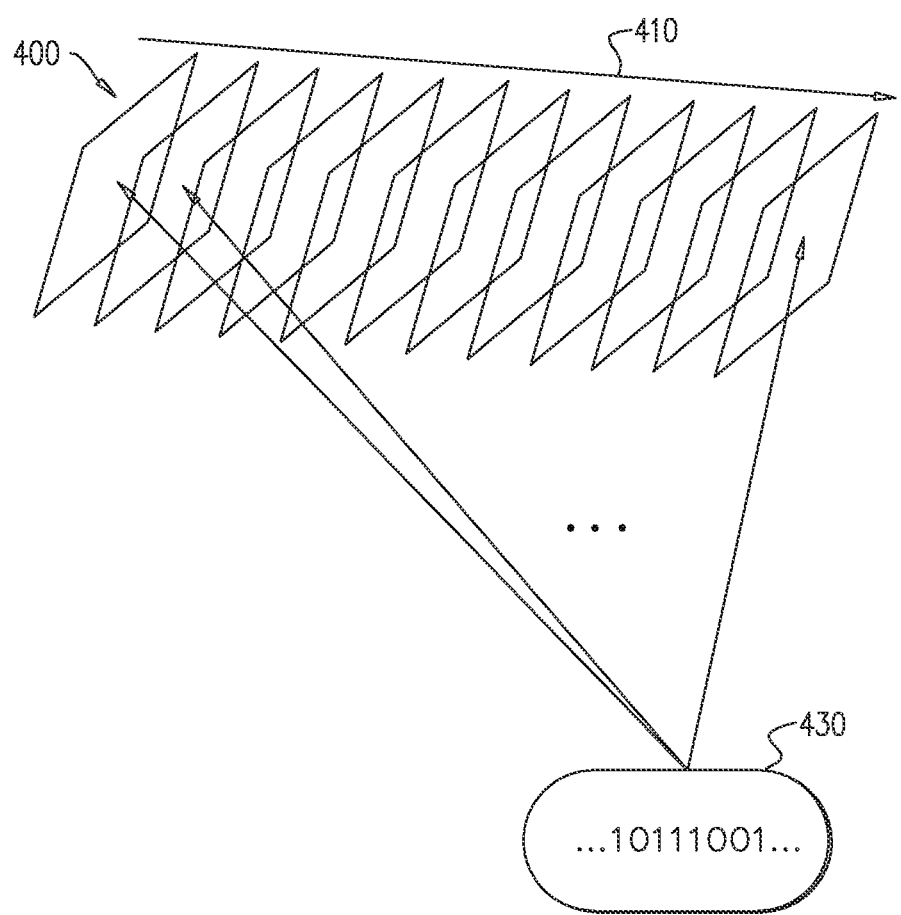
FIG. 4 is a simplified block drawing depicting the embedding device of FIG. 3 embedding payload data into a sequence of video frames.

Reference now made to FIG. 4, which is a simplified block drawing depicting the embedding device 125 of FIG. 3 embedding payload data into a sequence of video frames, such as the I-frame 103 of FIG. 1. FIG. 4 is a very high level depiction of what happens in the embedding device 125. A plurality of video frames 400 is depicted, and arrow 410 indicates that the frames 400 depicted on the left side of FIG. 4 are video frames prior to the frames 400 depicted on the right side of FIG. 4. A string of bits 430 is depicted. At least one bit of the string of bits 430 is embedded in one of the I-frames of the plurality of video frames 400. For instance, one bit may be embedded in each one of the video I-frames. So, the first 1 of the 10111001 is embedded in the first video I-frame of the plurality of video frames 400. The second bit, 0, is embedded in the second I-frame of the plurality of video frames 400. The third bit, 1 is embedded in the third I-frame of the plurality of video frames 400, and so forth.

Alternatively, the embedding scheme may entail embedding a number of bits in a single video frame (for example, dividing the frame into quadrants, and embedding one different bit in each quadrant), or embedding a single bit in every third video frame, or any other variation and combination of bits and frames. It is appreciated that the embedding scheme is stored for use in detecting the embedded watermark. Additionally or alternatively, a configuration of the embedding device 125 may be stored for use in detecting the embedded watermark.

Each bit to be embedded as a portion of the watermark will typically be embedded a number of times in the frame (or portion of the frame) in order to ensure that the bit is not lost due to an error in transmission. Bits may also be lost due to errors introduced by change of values due to re-encoding, transcoding, etc. or error/noise in the detection process itself. A single bit is more likely to be lost due to some error or a transformation of the video, such as re-encoding, transcoding, cropping, aspect ratio change, contrast correction, and so forth, than many copies of the single bit which are embedded.

As was noted above, the video which may be uploaded to the content sharing network may have been transformed in some fashion, including, but not limited to having been re-encoded to MPEG-2 video; transcoded to non-MPEG-2 video; cropped; resized; degraded; or subjected to one of cropping, aspect ratio change, contrast correction. As a result, frames which were originally encoded as I-frames in the original video stream 115 may now no longer be encoded as I-frames. Rather such frames may have been re-encoded or transcoded as predicted frames (i.e. P- or B-frames). Accordingly, each frame in the video stream 210 provided to the detection device 200 should be checked by the detection device 200 in order to determine if the frame comprises at least one watermark bit.

Accordingly, the detection phase works on uncompressed images and not on an encoded video, such as the original video stream 115. This has the advantage that the detection device 200 is operative whether or not the video stream 210 provided to the detection device 200 has been transcoded or changed in other ways. As long as the video at hand can be decoded, the detection phase starts after decoding it into separate frames as images. The detection technique on images works as follows:

1. Determine or detect which frames correspond to the original I frames. This can be done by various means, depending on the setting:
   a. If GOP (Group of Pictures) sizes are fixed and the GOP size is known (e.g. 8 frames, 12 frames, 16 frames, etc.) or can be estimated, the detection device tries each of the possible candidate GOP 'phases' for detecting where the GOP begins and which frames correspond to the original I-frames. By way of example, if the known GOP size is 12, then first try frames 0, 12, 24, 36, . . . and see if those frames correspond to I-frames. If those frames do not correspond to I-frames, then try fames 1, 13, 25, 37, . . . , and see if those frames correspond to I-frames. If those frames do not correspond to I-frames, then try frames 2, 14, 26, 38, . . . , and so forth.
   b. If GOP sizes are fixed but the GOP size is not known, typical values for the GOP size can be tried, and then the procedure described in the previous paragraph is repeated for each potential GOP size.
   c. If GOP sizes are not always fixed, each frame may be statistically checked to determine if it corresponds to an original I-frame. This is done by dividing the frame into macroblocks and blocks, calculating the DC coefficient for the Y/U/V (depending which was used for embedding) for each block, and for those pairs of neighboring blocks satisfying the condition that was used for selecting pairs of blocks for embedding, counting how many of the pairs embed 0 and how many of them embed 1. These steps are substantially the same as the steps listed below as steps 2-7. Here these steps are performed provisionally, before it is assumed that a candidate frame corresponds to an original I-frame, and only if resulting counts are highly biased (i.e., the probability for obtaining the resulting count given the assumed uniform distribution can be evaluated using a chi-square score and its p-value), then the candidate frame can be considered as an original I-frame. If the frame is not determined to have been an original I-frame, then it is skipped by the watermark detector. If the frame is accepted as corresponding to an original I-frame, since I-frames typically do not appear in close temporal proximity, the next few frames (typically the size of a minimally small GOP) can be skipped.

Regarding the chi-square score and its p-value as mentioned above, a very low p-value (such as $2^{-20}$) indicates that the count is very unlikely if it assumed that that the bits are uniformly distributed is to be accepted (i.e. if it assumed that about half of the bits will be 0 and about half of the bits will be 1). Hence in a case with a very low p-value the count is indeed highly biased and this frame is accepted as having been an I-frame. By way of example, a count such as 113:29 is very biased.

2. Partition the frames that were determined to correspond to the original I frames into units which are of the same size as the macroblocks in the original encoding. Each such unit is then subdivided into sub-units which are of the same size as the original blocks. In other words, if the images have been resized, they need to be resized back to the original size (as is known to the watermark embedder) of the video before they are partitioned into 16×16 pixel macroblocks and 8×8 blocks by any technique for image resizing well known in the art, such as bilinear interpolation and bicubic interpolation.

3. For each reconstructed macroblock, separate the pixel values into Y (luma), U and V (chroma) planes.

4. Apply a DCT transform on each block for the Y, U or V plane, according to the original configuration of which of the Y, U, and V, planes were used by the embedding device 125 to perform the embedding.

5. Look for neighboring blocks (either in luma or chroma planes according to the original configuration of the embedding device 125) such that the absolute value of the difference between the dct_diff values of the two neighboring blocks are within the threshold configured in the embedding device 125, and not equal to 0.

6. For each such pair of neighboring blocks that satisfies this condition, if the first dct_diff value is smaller than the second, treat this as a 0 bit, and if it is greater treat it as a 1 bit.

7. Count the number of 0s and 1s in all such pairs of blocks in the frame.

8. Take the majority of the resulting counts, and treat the majority as the payload bit embedded in this frame (or slice, or macroblock, etc. depending on the way the watermark was originally embedded). For example, if the count is 73 zeros and 14 ones, then the majority is zero, because 73>14.

It is understood that if multiple payload bits were embedded in every frame, then the description above has to be modified accordingly. For example, if one payload bit is to be embedded in each quadrant of the I-frame 103, then each quadrant of the I-frame 103 will be examined as described above to determine the payload bit embedded therein. Likewise, if the watermark payload was embedded in slices or macroblocks of the original video frame, then each slice or macroblock of the I-frame 103 will be examined as described above to determine the payload bit embedded therein.

It is understood that if there is an additional halting condition on which pairs of blocks to consider, then the description above has to be modified accordingly. For example, if the payload is only to be embedded only in the first pair of blocks in every slice, then the above method for detection of the watermark will only be applied to the first pair of blocks in every slice.

Figure 5:
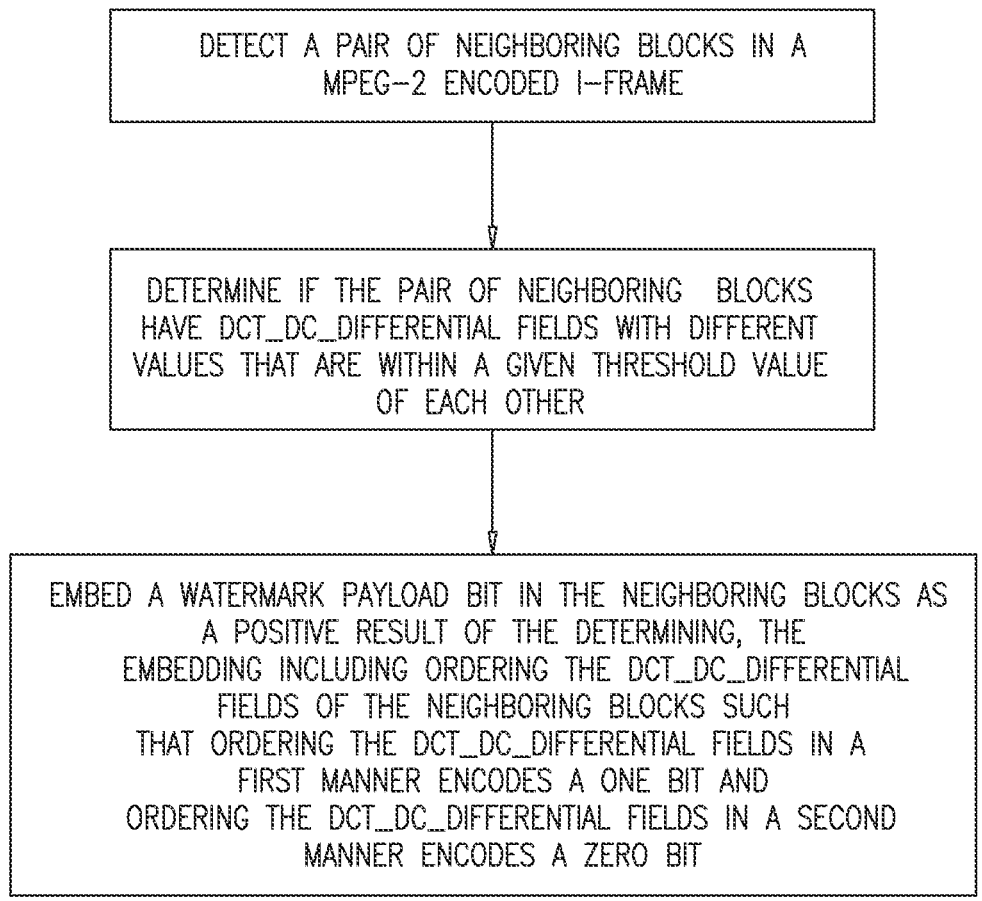
FIG. 5 is a simplified flow chart of a method of embedding the watermark of FIG. 1.
Figure 6:
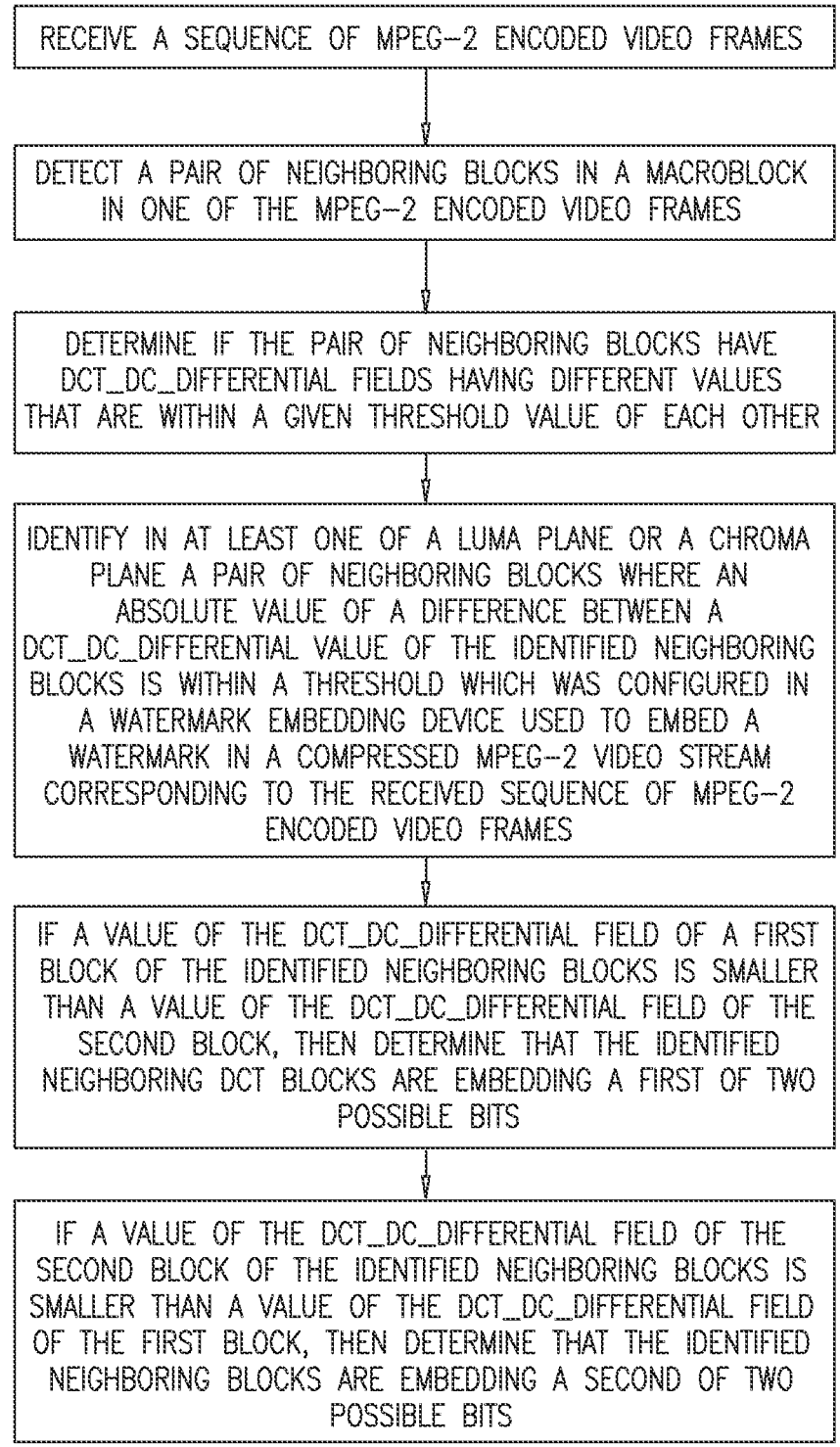
FIG. 6 is a simplified flow chart of a method of detecting the watermark of FIG. 1.
Figure 7A:
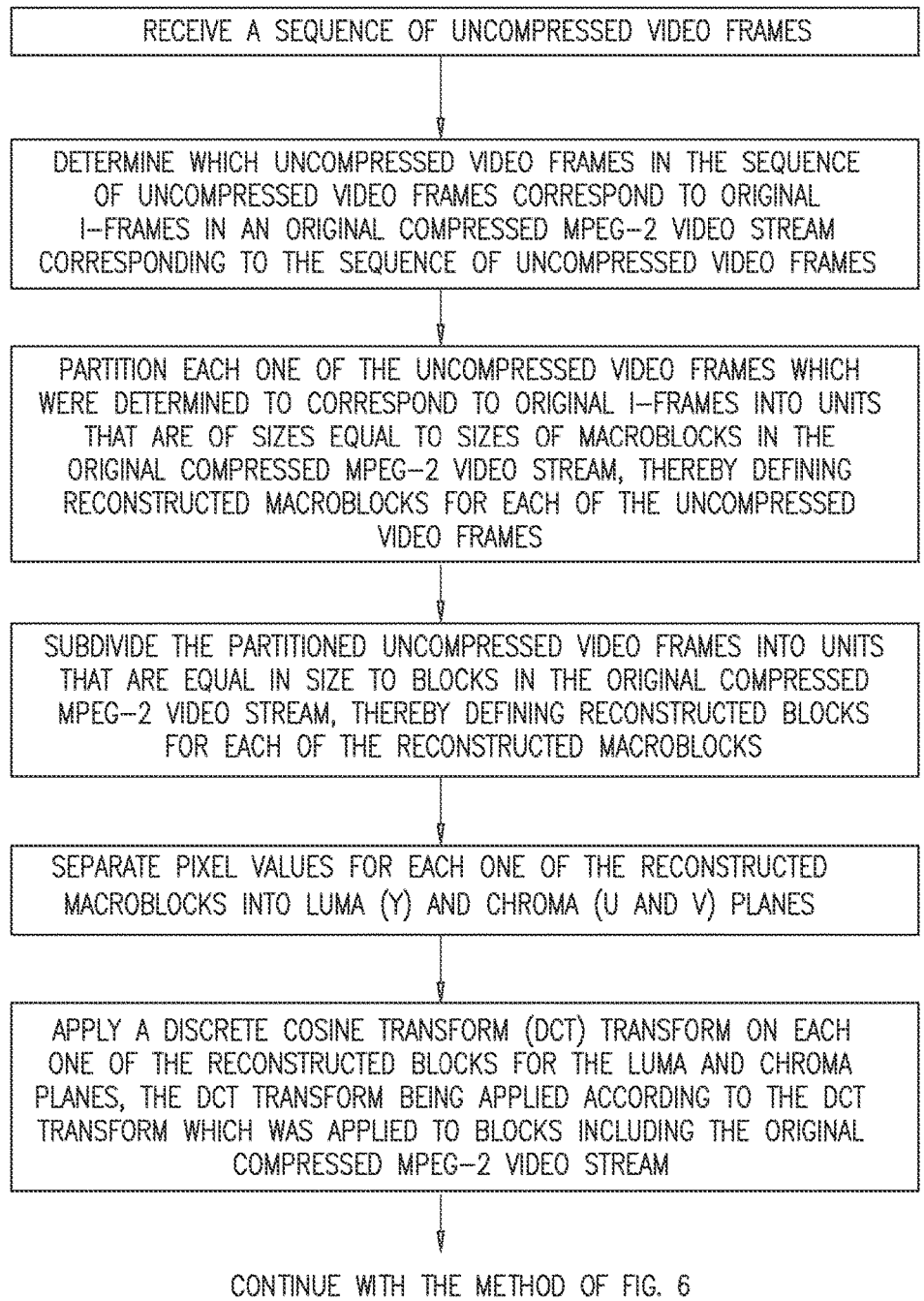

Reference is now made to FIG. 5, which is a simplified flow chart of a method of embedding the watermark of FIG. 1. Reference is additionally made now to FIG. 6, which is a simplified flow chart of a method of detecting the watermark of FIG. 1. FIG. 6 describes one method for detecting the watermark of FIG. 1 when provided with MPEG-2 video. Reference is further made now to FIGS. 7A-7B, which is a simplified flow chart of a second method of detecting the watermark of FIG. 1. FIG. 7A describes one method for detecting the watermark of FIG. 1 when provided with uncompressed video frames, necessitating adapting the provided uncompressed video frames into an MPEG-2 format so that the method of FIG. 6 may be executed on the provided uncompressed video frames. FIG. 7B describes a continuation of the method begun in FIG. 7A, after the method of FIG. 6 has been executed on the output of the method of FIG. 7A.

The methods of FIGS. 5, 6, and 7A-7B are believed to be self-explanatory with reference to the above discussion.

Embedded Versus Encoded Versus Encrypted

The term "embedded" is used throughout the present specification and claims, in all of its grammatical forms, to refer to any type of activity involving placing the watermark, or portions thereof, in the video stream. For example, "embedding the watermark", "embedded bit", "a watermark embedding device", and so forth.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/ or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
   detecting a pair of consecutive blocks in a MPEG-2 encoded I-frame, the consecutive blocks having dct_dc_differential fields with different values that are within a given threshold value of each other, and
   embedding one of a first watermark payload bit or a second watermark payload bit in the consecutive blocks by ordering dct_dc_differential fields of the consecutive blocks such that ordering the dct_dc_differential fields in an ascending order encodes the first payload bit and ordering the dct_dc_differential fields in a descending order encodes the second payload bit, the embedding comprising swapping the dct_size and one of the dct_dc_differential_l or dct_dc_differential_c fields between the pair of consecutive blocks when, as a result of embedding the one of a first watermark payload bit or a second watermark payload bit the dct_dc_differential fields are ordered to maintain syntax which conforms with MPEG-2 encoded video and to encode one of the first payload bit or the second payload bit.

2. The method according to claim 1 wherein the swapping also comprises swapping dct_dc_size fields of the consecutive blocks to achieve the desired bit encoding.

3. The method according to claim 1 wherein a single bit is repeatedly embedded in at least a portion of the encoded I-frame.

4. The method according to claim 1 wherein a plurality of bits is encoded in different macroblocks comprised in the encoded I-frame.

5. The method according to claim 1 wherein the pair of consecutive blocks comprise one of: chrominance blocks; and luminance blocks.

6. The method according to claim 1 wherein the embedded bit is a bit in a bit string comprising identifying information.

7. The method according to claim 6 wherein the identifying information comprises user identifying information.

8. The method according to claim 6 wherein the identifying information comprises user client device identifying information.

9. The method according to claim 6 wherein the identifying information comprises media identifying information.

10. A method comprising:
    (a) receiving a sequence of MPEG-2 encoded video frames;
    (b) detecting a pair of consecutive blocks in a macroblock in one of the MPEG-2 encoded video frames;
    (c) in response to determining that the pair of consecutive blocks have dct_dc_differential fields having different values that are within a given threshold value of each other,
    identifying in at least one of a luma plane or a chroma plane a pair of consecutive blocks where an absolute value of a difference between a dct_dc_differential value of the identified consecutive blocks is within a threshold which was configured in a watermark embedding device used to embed a watermark in a compressed MPEG-2 video stream corresponding to the received sequence of MPEG-2 encoded video frames;
    (d) determining that the identified consecutive blocks have an embedded first payload bit of two possible payload bits when a value of the dct_dc_differential field of a first block of the identified consecutive blocks is smaller than a value of the dct_dc_differential field of the second block;
    (e) determining that the identified consecutive blocks have an embedded second payload bit of two possible payload bits, when a value of the dct_dc_differential field of the second block of the identified consecutive blocks is smaller than a value of the dct_dc_differential field of the first block; and
    (f) extracting embedded watermark data as either one of the embedded first payload bit or the embedded second payload bit.

11. The method according to claim 10 further comprising performing the following steps prior to step (a):
    (aa) receiving a sequence of uncompressed video frames;
    (ab) determining which uncompressed video frames in the sequence of uncompressed video frames correspond to original I-frames in an original compressed MPEG-2 video stream corresponding to the sequence of uncompressed video frames;
    (ac) partitioning each one of the uncompressed video frames which were determined to correspond to original 1-frames into units that are of sizes equal to sizes of macroblocks in the original compressed MPEG-2 video stream, thereby defining reconstructed macroblocks for each of the uncompressed video frames;

(ad) subdividing the partitioned uncompressed video frames into units that are equal in size to blocks in the original compressed MPEG-2 video stream, thereby defining reconstructed blocks for each of the reconstructed macroblocks;

(ae) separating pixel values for each one of the reconstructed macroblocks into luma (Y) and chroma (U and V) planes;

(af) applying a discrete cosine transform (DCT) transform on each one of the reconstructed blocks for the luma and chroma planes, the DCT transform being applied according to the DCT transform which was applied to blocks comprising the original compressed MPEG-2 video stream; and performing the following steps after step (e):

(g) counting the number of bits determined as being the first of the two possible bits and the number of bits determined as being the second of the two possible bits for all identified consecutive blocks in a candidate frame; and (h) taking a majority between the resulting counts of the first of the two possible bits and second of the two possible bits and recovering the majority count as signifying an embedded watermark bit.

12. The method according to claim 11 wherein the determining which uncompressed video frames in the sequence of uncompressed video frames correspond to original I-frames is performed by testing known GOP phases in an attempt to determine where the GOP begins, where the GOP size is known.

13. The method according to claim 12 wherein the testing known GOP phases in an attempt to determine where the GOP begins is performed for each of the uncompressed video frames in the sequence of uncompressed video frames.

14. The method according to claim 11 wherein the determining which uncompressed video frames in the sequence of uncompressed video frames correspond to original I-frames is performed by statistically checking every uncompressed video frame to determine if the uncompressed video frame corresponds to an original I-frame.

15. The method according to claim 14 wherein the statistically checking every uncompressed video frame comprises:

dividing a candidate uncompressed video frame into macroblocks and blocks;

calculating a DC coefficient for at least one of the chroma and luma components for each block;

provisionally performing steps (ac) through (g);

determining that the candidate uncompressed video frame corresponds to an original I-frame if resulting counts are biased.

16. The method according to claim 11 and further comprising:

storing recovered each stored watermark bit; and assembling all of the stored recovered stored watermark bits; and recovering an original identifying value used as a watermark.

17. A system comprising:

a processor comprised in a watermark embedding device which detects a pair of consecutive blocks in a MPEG-2 encoded I-frame, and the consecutive blocks having dct_dc_differential fields with different values that are within a given threshold value of each other; and the processor being further operative to embed, as a result of having determined that the pair of consecutive blocks have dct_dc_differential fields with different values that are within a given threshold value of each other, a watermark payload bit in the consecutive blocks by ordering dct_dc_differential fields of the consecutive blocks such that when the dct_dc_differential fields are ordered in a first manner, the ordering encodes a one bit, and when the dct_dc_differential fields are ordered in a second manner the ordering encodes a one bit, bit, the embedding comprising swapping the dct_size and one of the dct_dc_differential_l or dct_dc_differential_c fields between the pair of consecutive blocks when, as a result of embedding the one of a first watermark payload bit or a second watermark payload bit the dct_dc_differential fields are ordered to maintain syntax which conforms with MPEG-2 encoded video and to encode one of the first payload bit or the second payload bit.

* * * * *